United States Patent
Glashagel et al.

(10) Patent No.: US 6,688,677 B2
(45) Date of Patent: Feb. 10, 2004

(54) BODYWORK FRAME FOR A MOTOR VEHICLE

(75) Inventors: Mario Glashagel, Friolzheim (DE); Bernhard Holzapfel, Mössingen (DE); Elmar Freitag, Weil der Stadt (DE); Bernd Harloff, Böblingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/116,124

(22) Filed: Apr. 5, 2002

(65) Prior Publication Data

US 2002/0163225 A1 Nov. 7, 2002

(30) Foreign Application Priority Data

Apr. 5, 2001 (DE) .......................... 101 17 010

(51) Int. Cl.[7] .............................. B60R 27/00
(52) U.S. Cl. ..................... 296/203.01; 296/193.06; 296/203.03; 296/205
(58) Field of Search ............. 296/203.01, 204, 296/205, 203.03, 193.06; 280/796, 785, 798

(56) References Cited

U.S. PATENT DOCUMENTS

| 4,081,197 | A | * | 3/1978 | Ackel | 296/204 |
|---|---|---|---|---|---|
| 4,514,008 | A | * | 4/1985 | Watanabe et al. | 296/204 |
| 4,978,164 | A | * | 12/1990 | Nakamura et al. | 296/203.03 |
| 5,002,333 | A | * | 3/1991 | Kenmochi et al. | 296/204 |
| 5,127,704 | A | * | 7/1992 | Komatsu | 296/204 |
| 5,362,120 | A | * | 11/1994 | Cornille, Jr. | 296/203.01 |
| 5,671,968 | A | | 9/1997 | Masuda et al. | 296/188 |
| 5,720,511 | A | * | 2/1998 | Benedyk | 296/203.01 |
| 5,806,918 | A | * | 9/1998 | Kanazawa | 296/204 |
| 5,975,625 | A | * | 11/1999 | Simplicean | 296/203.01 |
| 6,039,386 | A | * | 3/2000 | Hasshi et al. | 296/203.01 |
| 6,168,228 | B1 | * | 1/2001 | Heinz et al. | 296/204 |
| 6,382,710 | B1 | * | 5/2002 | Funk et al. | 296/189 |

FOREIGN PATENT DOCUMENTS

| DE | 4016730 A1 | 11/1991 |
|---|---|---|
| DE | 40 16 730 C2 | 9/1993 |
| DE | 19603098 A1 | 7/1997 |
| DE | 19954296 A1 | 5/2001 |
| JP | 2000-177629 | 6/2000 |

* cited by examiner

Primary Examiner—Stephen T. Gordon
Assistant Examiner—Lori L Coletta
(74) Attorney, Agent, or Firm—Crowell & Moring LLP

(57) ABSTRACT

A bodywork frame for a motor vehicle, in particular a passenger car, has two lateral load bearing columns. The columns are supported on each other at a roof side via a pressure-stable cross member and at a floor side on a longitudinal tunnel and via pressure-stable seat cross members.

14 Claims, 2 Drawing Sheets

BODYWORK FRAME FOR A MOTOR VEHICLE

This application claims the priority of German application 101 17 010.6, filed Apr. 5, 2001, the disclosure of which is expressly incorporated by reference herein.

BACKGROUND AND SUMMARY OF THE INVENTION

The present invention relates to a bodywork frame for a motor vehicle.

Such a bodywork frame normally has two lateral load bearing columns which, in the case of a passenger car, are designated "A", "B" or "C" columns in accordance with their positions. DE 40 16 730 C2 discloses load bearing columns for a bodywork frame of this type which have column-like hollow bodies. Each hollow body has two profiled shells which enclose a cavity in which a tubular element is arranged, which extends in the longitudinal direction of the hollow body and is fixed to the hollow body.

In a bodywork frame whose load bearing columns are arranged in the region of the backrest of a driver or passenger seat ("B columns"), for modern motor vehicles, a particularly high side impact stability is required in order, in the event of a side impact, to be able to ensure the undisrupted unfolding of a side impact air bag unfolding between the back rest and load bearing column. In addition, the passenger compartment should ensure the safety of the vehicle occupants, even when the vehicle is turned over. Furthermore, there is the desire to incline the load bearing columns of the load bearing frame to the greatest extent possible with respect to a vertical axis, in order, as a result, to be able to design the vehicle to be flatter.

The present invention tackles the problem of specifying, for a bodywork frame of the type mentioned at the beginning, a design form which ensures increased side impact protection.

According to the invention, this problem is solved by a bodywork frame for a motor vehicle, in particular a passenger car, comprising two lateral load bearing columns, which are supported on each other, at a roof side, via a pressure-stable roof cross member and, at a floor side, on a longitudinal tunnel, in each case via a pressure-stable seat cross member. The invention also concerns a process of providing such a bodywork frame.

The invention is based on the general idea of configuring the bodywork frame in such a way that an annularly closed assembly is formed by the load bearing columns. As a result, intensive support for the load bearing columns is ensured in the transverse direction of the vehicle. In the bodywork frame according to the invention, this is implemented by supporting the two load bearing columns on each other at the roof side via a pressure-stable roof cross member and at the floor side via an assembly of seat cross members and longitudinal tunnel. In the region of the load bearing columns, the bodywork frame thus has a high dimensional stability, in particular in the event of a side impact and in the event of turning over. Therefore, the bodywork frame according to the invention, if one of its load bearing columns is used as a B column, can ensure a sufficient spacing between the B column and back rest for a sufficiently long time in order to ensure the unfolding of a side impact air bag. As a result of the increased stability of the B column, the load on the A column can be relieved, so that the latter can be designed flatter, narrower and with an increased inclination.

In a preferred embodiment, the two seat cross members can additionally be supported on each other by a pressure-stable bridge beam which bridges over the longitudinal tunnel. By means of this, the transverse support of the two load bearing columns on each other in the floor area is improved considerably.

Roof cross members and/or seat cross members and/or bridge beams are preferably equipped with a pressure-stable hollow profile. Using hollow profiles, a particularly high pressure stability can be achieved, it being possible at the same time to implement a low component weight.

In a particularly advantageous embodiment, each of the load bearing columns can be equipped with a column-like hollow body, in which a tubular element extends substantially in the longitudinal direction of the hollow body. A tubular element has very high stiffness values, so that the stability of the load bearing columns and therefore of the bodywork frame is improved.

Further important features and advantages of the invention will be apparent from dependent claims, the drawings, and the associated description of the drawings.

The features mentioned above and the features still to be explained below can be used not only in the respectively specified combination but also in other combinations or on their own without departing from the scope of the present invention.

BRIEF DESCRIPTION OF THE DRAWINGS

A preferred exemplary embodiment of the invention is illustrated in the drawings and will be explained in more detail.

DETAILED DESCRIPTION OF THE INVENTION

Figure 1:
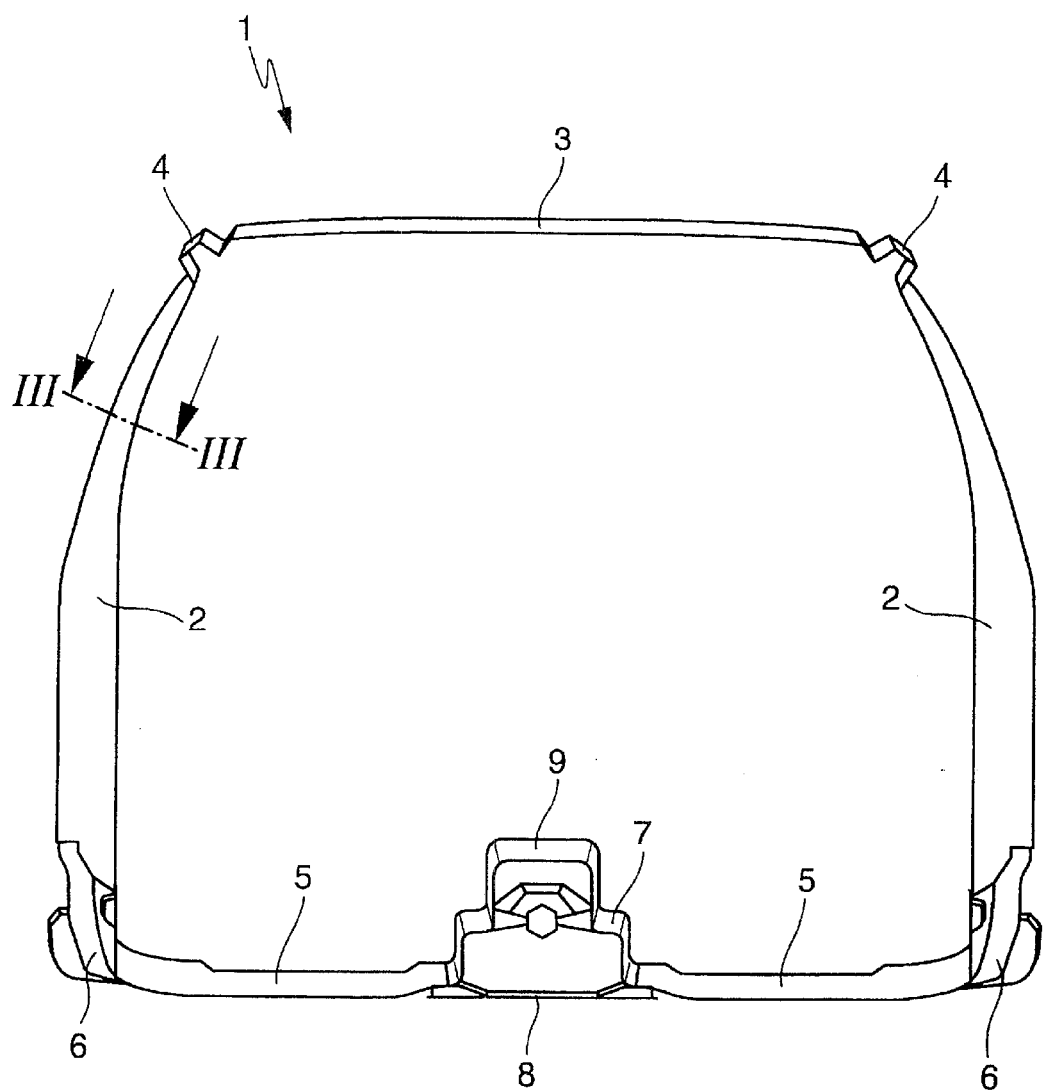
FIG. 1 shows a cross section through a bodywork frame according to the invention.

According to FIG. 1, a bodywork frame 1 according to the invention, in each case, has a load bearing column 2 on each side of the vehicle, in particular a passenger car. The columns are used, for example, as B columns of a passenger car. At their upper ends, the two load bearing columns 2 are fixed to a common roof cross member 3 and are supported on each other by the latter. The roof cross member 3 is preferably formed of a pressure-stable hollow profile. In the present case, the fixing and supporting of the load bearing columns 2 on the roof cross member 3 is carried out indirectly via respective longitudinal roof beams 4.

Each of the load bearing columns 2 is connected at its lower end to a seat cross member 5. It is possible for this attachment also to be carried out indirectly via a longitudinal floor beam 6. The seat cross members 5 are also of particularly pressure-stable design and have appropriate hollow profiles.

At their ends facing away from the load bearing columns 2, the seat cross members 5 are supported on a longitudinal tunnel 7 of the bodywork frame 1. The supporting action in the vehicle transverse direction is improved in the area of the longitudinal tunnel 7 by a bridge beam 8, via which the seat cross members 5 are supported on each other. The bridge beam 8 is here arranged underneath the longitudinal tunnel 7 and fixed to the seat cross members 5. The bridge beam 8 is also of pressure-stable design and preferably has an appropriate hollow profile.

Placed on the longitudinal tunnel 7 is a U profile 9 which, in the event of a crash, serves for the purpose of supporting the vehicle seats, arranged on each side thereof, but not illustrated, on each other.

Since the two load bearing columns 2 are supported on each other, at the roof side, via the roof cross members 3 and, at the floor side, via the seat cross members 5, the longitudinal tunnel 7 and the bridge beam 8, the result is an annularly closed load bearing assembly which has a particularly high stability, in particular in the case of a side impact.

Figure 2:
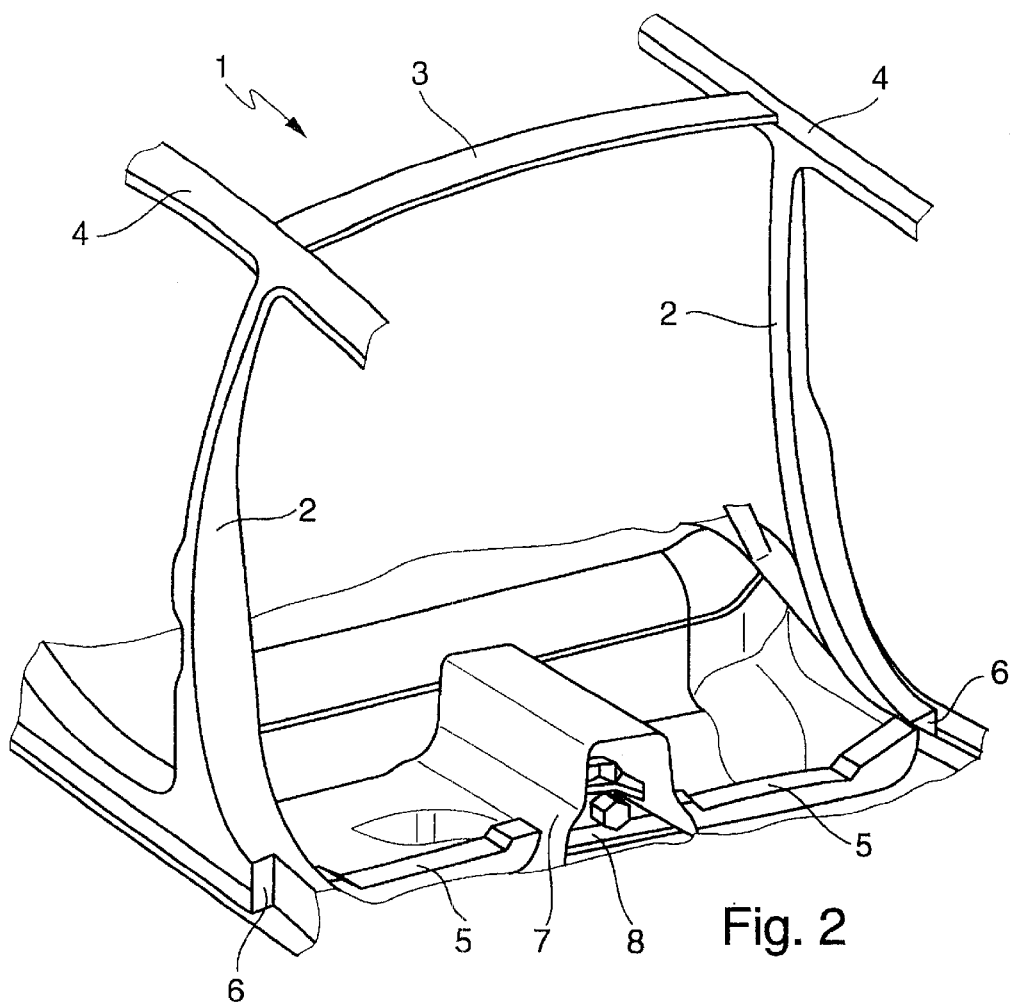
FIG. 2 shows a perspective view of a section of the bodywork frame containing the cross section according to FIG. 1.

The annularly closed beam assembly can also be seen clearly in FIG. 2. In this case, it is of particular importance that the load bearing beams 2 and the roof cross members 3 lie substantially in a common plane which runs transversely with respect to the vehicle longitudinal direction. Furthermore, the seat cross members 5 preferably lie in the same plane as the load bearing columns 2 and the roof cross member 3. In addition, it can be seen particularly clearly in FIG. 2 that the two seat cross members 5, via the bridge beam 8, form a substantially rectilinear support for the load bearing columns 2 at the floor side. Therefore, in the case of the preferred embodiment, the aforementioned annularly closed beam assembly lies in a plane which runs substantially transversely with respect to the vehicle longitudinal direction. In this way, a particularly high side impact stability results in this plane, in which the load bearing columns 2 are used, for example, as B columns.

Figure 3:
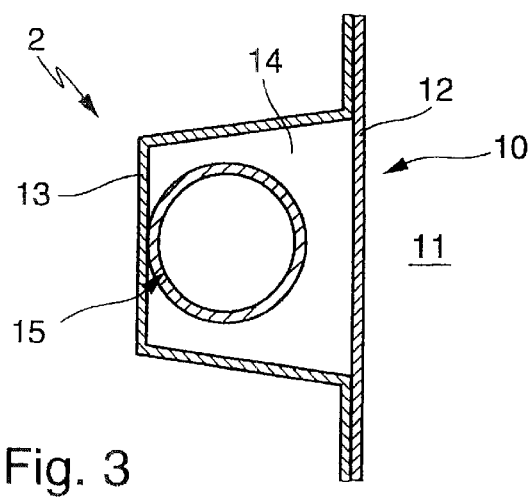
FIG. 3 shows a section through a load bearing column, corresponding to the section lines III in FIG. 1.

According to FIG. 3, a preferred embodiment of the load bearing columns 2 has a column-like hollow body 10 which has two profiled shells, namely an inner shell 12 facing a vehicle interior space 11 and an outer shell 13 facing away from the vehicle interior space 11. This outer shell 13 is designed in a U shape or a C shape, while the inner shell 12 acts as a cover. The two profiled shells 12 and 13 enclose a cavity 14, in which a tubular element 15 is arranged. In this case, this tubular element 15 extends substantially in the longitudinal direction of the hollow body 10 and is fixed to the latter or to its outer shell 13. The load bearing column 2 is inserted into an outer skin of vehicle bodywork otherwise not illustrated.

By means of the tubular element 15, which preferably consists of a high-strength material, the stiffness and the side impact stability and turnover stability of the load bearing column 2, and therefore of the bodywork frame 1, can be improved considerably.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. A bodywork frame for a motor vehicle, in particular a passenger car, comprising two lateral load bearing columns, which are supported on each other, at a roof side, via a pressure-stable roof cross member and, at a floor side, on a longitudinal tunnel, in each case via a pressure-stable seat cross member, wherein each load bearing column has a column-like hollow body, and wherein a tubular element, which extends substantially in a longitudinal direction of the load bearing column, is arranged within said column-like hollow body.

2. The bodywork frame according to claim 1, wherein each of the seat cross members is additionally supported on the other via a pressure-stable bridge beam, which bridges the longitudinal tunnel.

3. The bodywork frame according to claim 2, wherein at least one of the roof cross member, the seat cross member, and the bridge beam has a pressure-stable hollow profile.

4. The bodywork frame according to claim 1, wherein the load bearing columns are B columns.

5. The bodywork frame according to claim 1, wherein the tubular element is formed from at least one tube of a high-strength material and having a constant cross section.

6. The bodywork frame according to claim 1, wherein at least one of the roof cross member and the seat cross member has a pressure-stable hollow profile.

7. The bodywork frame according to claim 2, wherein the load bearing columns are B columns.

8. The bodywork frame according to claim 3, wherein the load bearing columns are B columns.

9. The bodywork frame according to claim 6, wherein the load bearing columns are B columns.

10. A process of providing a bodywork frame for a motor vehicle, in particular a passenger car, ensuring increased side impact protection comprising:

providing two lateral load bearing columns, and supporting the two lateral load bearing columns on each other, at a roof side, via a pressure-stable roof cross member and, at a floor side, on a longitudinal tunnel, in each case via a pressure-stable seat cross member, wherein each load bearing column has a column-like hollow body, and wherein a tubular element, which extends substantially in a longitudinal direction of the load bearing column, is arranged within said column-like hollow body.

11. The process according to claim 10, and further comprising additionally supporting the seat cross members on each other via a pressure-stable bridge beam, which bridges the longitudinal tunnel.

12. The process according to claim 11, wherein at least one of the roof cross member, the seat cross member, and the bridge beam has a pressure-stable hollow profile.

13. The process according to claim 10, wherein the load bearing columns are B columns.

14. The process according to claim 10, wherein the tubular element is formed from at least one tube of a high-strength material and having a constant cross section.

* * * * *